United States Patent [19]

Crowley et al.

[11] E Re. 28,656

[45] Reissued Dec. 16, 1975

[54] THERMOSTATLESS BLANKET CONTROL CIRCUIT

[75] Inventors: George C. Crowley, Winnetka; Gordon S. Carlson, Northbrook, both of Ill.

[73] Assignee: Northern Electric Company, Chicago, Ill.

[22] Filed: June 26, 1974

[21] Appl. No.: 483,213

Related U.S. Patent Documents

Reissue of:

[64] Patent No.: 3,673,381
Issued: June 27, 1972
Appl. No.: 192,181
Filed: Oct. 26, 1971

[52] U.S. Cl. ..... 219/212; 219/494; 317/41; 317/124; 317/132

[51] Int. Cl.[2] ..... H01H 37/00

[58] Field of Search..... 317/132, 40 R, 41, 124; 307/117; 219/212, 494

[56] References Cited

UNITED STATES PATENTS

| | | | |
|---|---|---|---|
| 2,959,662 | 11/1960 | Crowley et al. | 219/212 |
| 3,356,825 | 12/1967 | Mills et al. | 219/494 X |
| 3,361,941 | 1/1968 | Fickweiler | 317/132 |
| 3,445,631 | 5/1969 | Fickweiler | 317/132 X |

*Primary Examiner*—James D. Trammell
*Attorney, Agent, or Firm*—George R. Clark; Neil M. Rose; John S. Pacocha

[57] ABSTRACT

An overload protection circuit for an electric heating blanket is provided. A sensing element in the blanket is coupled to a neon-filled diode. When an overload condition is sensed the diode ceases to emit light and a bimetallic element in series with a light-responsive resistor causes a pair of contacts in series with the heating element to open.

6 Claims, 1 Drawing Figure

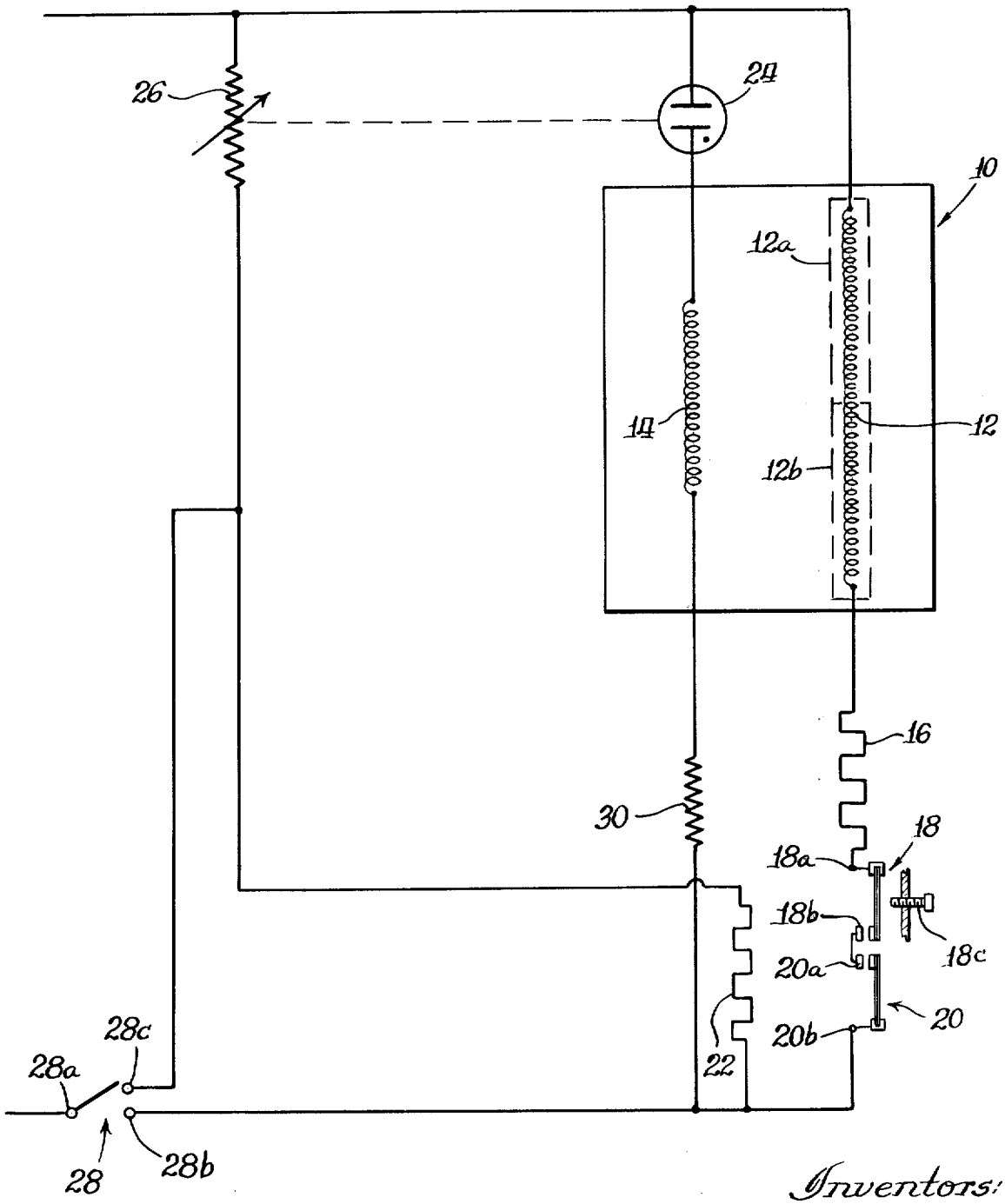
Inventors:
George C. Crowley
Gordon S. Carlson
By: Glenn W. Bowen
Atty.

THERMOSTATLESS BLANKET CONTROL CIRCUIT

Matter enclosed in heavy brackets [ ] appears in the original patent but forms no part of this reissue specification; matter printed in italics indicates the additions made by reissue.

BACKGROUND OF THE INVENTION

Electric heating blankets are commonly constructed with a heat-sensitive sensing wire or element and a heating wire or element. One frequently encountered electric heating blanket construction consists of a flexible insulating core around which the heating wire and sensing wire are wound. The heating and sensing wire are separated by a layer of heat sensitive material. The resistance of the heat-sensitive material varies inversly with the temperature of the heating wire and this variation is sensed by the sensing wire to provide for overload protection. An insulating covering is preferably supplied over the sensing wire.

Control for a blanket of the type described is conventionally achieved by a means of a thermally sensitive switch which has a pair of contacts coupled in series with the heating wire. The sensing wire may be coupled to the control circuit of a second thermally sensitive switch which has pair of overload contacts in series with the heating wire. The second thermal switch provides overload protection for the blanket. The bimetallic thermal control switches which are commonly used to control the operation of the overload contacts are expensive and are capable of handling only a very small amount of power. Moreover, these switches tend to be overly sensitive and are difficult to manufacture.

It is therefore an object of the present invention to provide a relatively inexpensive and uncomplicated thermal overload circuit.

It is another object of the present invention to provide an overload protection circuit for an electric blanket wherein a light source is activated by a sensing wire and a light-responsive switch means is activated by the light source to open the heating wire circuit of the blanket wire.

It is a further object of the present invention to provide an electric blanket control in which a neon-filled diode is coupled in series with a sensing wire *and is connected between the sensing wire and the heater in parallel with a heat sensitive material* so that the neon gas in the diode is de-ionized when an overload condition exists, and in which a light-responsive means reacts to the absence of light from the ionized neon by opening the heating wire circuit.

DESCRIPTION OF THE DRAWING

The FIGURE is a schematic diagram of an embodiment of the present invention.

TECHNICAL DESCRIPTION OF THE INVENTION

In order for an electric blanket to be suitable for personal use the blanket must be safe and it must be easy to operate. An electric heating blanket may become overheated during use thereby creating a dangerous risk to the user of the blanket. Therefore, virtually all commercially available blankets provide for some form of overload protection. The various control circuits that are conventionally employed, however, are relatively expensive to manufacture and are relatively difficult to manufacture. A reliable and inexpensive overload control circuit is provided by the present invention.

An electric blanket which incorporates the present invention is indicated by the reference number 10 of the FIGURE. The electric blanket 10 is constructed in a somewhat conventional manner in that it has a heating wire 12 and a sensing wire 14 incorporated therein. The length of the sensing wire is approximately equal to one-half the length of the heating wire 12, which is shown schematically in the FIGURE by the two half length sections 12a and 12b. The sensing wire 14 is wound through only one half of the electric blanket 10, but unlike most sensing wires the sensing wire 14 is able to carry enough electrical current to function as a heating wire also. The sensing wire 14 may by physically located in a portion of the heating blanket with either of the half-length segments of the heating wire in proximity to it. The resistance of the heating section which is in proximity to the sensing wire 14 will be however slightly different from the resistance of the other section of heating wire in order to provide for temperature equalization across the entire heating blanket 10.

The heating wire 12 is connected in series with the thermal control element 16 of the thermal switch across the input voltage line. The element 16 is a conventional bimetal thermal control element that is responsive to the current that flows through the heating wire 12 and is adjustable by the user by means of a conventional adjustment screw 18c. The switch 18 causes the connection between the points 18a and 18b to be repeatedly made and broken in a cyclic manner. The length of time that the connection is made during a given time period is determined by the setting of the adjustment screw.

In addition to the control switch 18 an overload switch 20 must be provided to insure that an overload condition does not damage the blanket and possibly result in a dangerous condition for the user of the blanket. When the blanket 10 is energized the overload switch 20 closes the heating wire circuit through the points 20a and 20b since the On-Off switch 28 is in its On position and electrical connection is also made between the points 28a and 28b. The bimetallic thermal control element 22 that controls the making and breaking of the switch 20 is coupled to the neon-filled diode 24. The diode 24 is coupled to the sensing wire 14 which in turn is coupled to the current limiting resistor 30. The diode 24 is normally energized so that the neon gas in the diode 24 is ionized and the diode 24 is consequently emitting light. *A heat sensitive material located between the* [The] sensing wire 14 *and the heating wire 12* is made of a material which has a decreased resistance when its temperature increases. When an overload condition occurs the [sensing wire 14] *heat sensitive material* heats up and the resistance of the [sensing wire] *material* then reduces sufficiently to cause the ionized gas in the diode 24 to be extinguished. When this occurs light will no longer be emitted by the diode 24. The light emission state of the diode 24 is used in the manner described below to control a light-responsive switch which opens and closes the heating wire circuit and it also may be used to give the user a visual indication of the overload condition if desired.

The current through bimetallic control element 22 controls contacts of the switch 20 which makes and breaks the electrical connection between the points

20a and 20b. When the neon gas in the diode 24 is ionized, light from the diode 24 is received by the light-responsive resistor 26, which may be a cadmium sulphide cell or other suitable element. The resistance of the light responsive resistor 26 is such that the current through the bimetallic element 22 causes sufficient heating of the element 22 so that it deflects enough to keep the switch 20 closed thereby completing the circuit between the points 20a and 20b when the neon gas in the diode 24 is ionized. If overload occurs, however, the absence of emitted light from the diode 24 causes the resistance of the light-responsive resistor 26 to increase sufficiently so that the current through the bimetallic element 22 decreases to the point where the element 22 cools off and deflects in a direction that causes the switch 20 to open the electrical connection between the points 20a and 20b of the heating wire circuit.

Since the operation of the light-responsive resistor 26 is critical it is desirable to be able to make the overload circuit fail-safe in the event that the resistance of the resistor 26 decreases materially or shorts out. For this purpose the On-Off switch 28 has a contact 28c which momentarily contacts the moving contact of the switch 28 when the switch is being turned on. This momentarily places the full line voltage across the resistor 26, and if the resistance of the resistor 26 is below a predetermined minimum value, it will be burned out causing an open circuit thereby making the overload circuit inoperative to close switch 20. This arrangement thus prevents energization of the heating elements 12 in the event that the overload circuit is not in condition to operate.

While a particular embodiment of the present invention has been described it is not intended that the invention be limited thereto since many modifications may be made and it is intended to cover any such modification that falls within the true scope and spirit of the appended claims.

What is claimed as new and desired to be secured by Letters Patent of the United States is:

1. An overload protection circuit for an electric blanket having a heating means and a sensing means *and a heat sensitive material* which has a resistance that decreases with increasing temperature, the sensing means being located in proximity in said blanket to said heating means and electrically coupled [in parallel with] *to* said heating means *by said heat sensitive material* comprising a diode filled with an ionizable gas which emits radiation when said gas is ionized; said diode being [coupled in series with] *connected between* said sensing means *and said heating means in parallel with said heat sensitive material*, control means having a pair of overload contacts which are coupled in series with said heating means and radiation responsive means coupled to said control means and positioned to receive said radiation from said diode; said control means being constructed to control the opening and closing of said overload contacts in accordance with the condition of said radiation responsive means wherein said condition changes in accordance with the radiation received by said radiation responsive means from said diode.

2. An overload protection circuit as set forth in claim 1 wherein said radiation responsive means is a resistor which has a resistance that varies as a function of the radiation said resistor receives from said diode.

3. An overload protection circuit as set forth in claim 2 further comprising a blanket energizing switch means which has contacts that momentarily place line voltage across said resistor when said switch is being changed from its off and its on position.

4. An overload protection circuit as set forth in claim 1 wherein said control means is a bimetallic control element that is coupled in series with said radiation responsive means across said series combination of said diode and said sensing means.

5. An overload protection circuit as set forth in claim 4 wherein said radiation responsive means is a resistor which has a resistance that varies as a function of the radiation said resistor receives from said diode.

6. An overload protection circuit as set forth in claim 5 further comprising a blanket energizing switch means which has contacts that momentarily place line voltage across said resistor when said switch is being changed from its off to its on position.

* * * * *